(12) United States Patent
Kokrehel et al.

(10) Patent No.: US 11,993,306 B2
(45) Date of Patent: May 28, 2024

(54) STEERING SYSTEM FOR A VEHICLE

(71) Applicant: KNORR-BREMSE Systeme fuer Nutzfahrzeuge GmbH, Munich (DE)

(72) Inventors: Csaba Kokrehel, Budapest (HU); Huba Nemeth, Budapest (HU); Peter Szell, Budapest (HU); Tamas Rapp, Budapest (HU); Kornel Straub, Pomaz (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 644 days.

(21) Appl. No.: 17/276,989

(22) PCT Filed: Sep. 4, 2019

(86) PCT No.: PCT/EP2019/073516
§ 371 (c)(1),
(2) Date: Mar. 17, 2021

(87) PCT Pub. No.: WO2020/057970
PCT Pub. Date: Mar. 26, 2020

(65) Prior Publication Data
US 2022/0033002 A1    Feb. 3, 2022

(30) Foreign Application Priority Data
Sep. 18, 2018 (EP) .................................... 18195301

(51) Int. Cl.
*B62D 15/02* (2006.01)
*B62D 5/00* (2006.01)

(52) U.S. Cl.
CPC ......... *B62D 15/0235* (2013.01); *B62D 5/001* (2013.01); *B62D 15/0225* (2013.01)

(58) Field of Classification Search
CPC .................. B62D 15/0225; B62D 15/0235
See application file for complete search history.

(56) References Cited

U.S. PATENT DOCUMENTS 7,347,433 B2    3/2008  Pressler et al.
9,193,380 B2 *  11/2015 Kogiso .............. B62D 15/0235
(Continued)

FOREIGN PATENT DOCUMENTS

CN    101190689 A    6/2008
CN    101506620 A    8/2009
(Continued)

OTHER PUBLICATIONS

Japanese-language Office Action issued in Japanese Application No. 2021-538907 dated Jun. 13, 2022 with English translation (six (6) pages).
(Continued)

*Primary Examiner* — Kevin Hurley
*Assistant Examiner* — Hosam Shabara
(74) *Attorney, Agent, or Firm* — Crowell & Moring LLP

(57) ABSTRACT

A steering system for a vehicle includes a steering gear, two knuckles of two steerable wheels, a steering actuator, a plurality of sensors, and a processing unit. The steering gear is connected to a first knuckle of the two knuckles and the steering gear is connected to a second knuckle of the two knuckles. The steering gear is connected to the steering actuator. The sensors are mounted at locations associated with the steering gear. Each of the plurality of sensors is configured to acquire steering system position information. Each of the plurality of sensors are configured to provide acquired steering system information to the processing unit.

7 Claims, 2 Drawing Sheets

(56) References Cited

U.S. PATENT DOCUMENTS

| | | |
|---|---|---|
| 9,878,741 B2 | 1/2018 | Cirillo |
| 2006/0022420 A1* | 2/2006 | Pressler ............... B62D 15/023 |
| | | 280/93.512 |
| 2008/0007251 A1 | 1/2008 | Lee |
| 2008/0127755 A1 | 6/2008 | Kim |
| 2017/0015348 A1 | 1/2017 | Sasaki et al. |
| 2019/0036425 A1 | 1/2019 | Hudelmaier et al. |
| 2021/0101640 A1* | 4/2021 | Buering .................. B62D 3/02 |

FOREIGN PATENT DOCUMENTS

| | | | |
|---|---|---|---|
| CN | 106029471 A | 10/2016 | |
| DE | 100 38 167 A1 | 2/2002 | |
| DE | 10038167 A1 * | 2/2002 | ......... B62D 15/0245 |
| DE | 100 46 816 A1 | 5/2002 | |
| DE | 101 50 305 A1 | 10/2002 | |
| DE | 10 2015 222 266 A1 | 5/2017 | |
| JP | 2007-253690 A | 10/2007 | |
| JP | 2007-302042 A | 11/2007 | |
| JP | 2015-63270 A | 4/2015 | |
| JP | 2017-52448 A | 3/2017 | |

OTHER PUBLICATIONS

Chinese-language Office Action issued in Chinese Application No. 201980061034.2 dated Jun. 29, 2022 with English translation (11 pages).

International Search Report (PCT/ISA/210) issued in PCT Application No. PCT/EP2019/073516 dated Dec. 3, 2019 (three (3) pages).

Written Opinion (PCT/ISA/237) issued in PCT Application No. PCT/EP2019/073516 dated Dec. 3, 2019 (10 pages).

Extended European Search Report issued in European Application No. 18195301.9 dated Mar. 19, 2019 with English translation (13 pages).

\* cited by examiner

STEERING SYSTEM FOR A VEHICLE

FIELD OF THE INVENTION

The present invention relates to a steering system for a vehicle.

BACKGROUND OF THE INVENTION

Future vehicles with steer-by-wire or highly automated driving systems need to provide a system that remains operable after a single failure in the system. Since the mechanical connection to the driver, or even the driver, will be missing from the steering control loop, redundancy is required to provide functionality after a failure. The failure of the system can be a malfunction of the steering angle sensor for example.

US2017015348 (A1) describes a power steering device having at least two redundant steering torque sensor units, at least two redundant steering angle sensor units, at least two redundant motor position sensor units and a control unit configured to: in a normal state, perform steering assist control based on a steering torque detection signal of one of the steering torque sensor units, a steering angle detection signal of one of the steering angle sensor units and a motor position detection signal of one of the motor position sensor units; perform redundant monitoring on the steering torque sensor units, the steering angel sensor units and the motor position sensor units; and, upon detection of an abnormality in any sensor output signal by the redundant monitoring, switch the abnormal signal to an alternative signal. It is described that it is possible by this control process to preserve the steering assist function even in the occurrence of the abnormality in the sensor output signal.

DE102015222266 (A1) relates to an electromechanical actuator for rack-and-pinion steering, wherein the actuator comprises a stator and a rotor. In addition, the actuator comprises an electronic system, which has at least one first electronic sub-system with a first power output stage, a first control unit and a first rotor position sensor arrangement and a second electronic sub-system with a second power output stage, a second control unit and a second rotor position sensor arrangement. In this way, the first electronic sub-system and the second electronic sub-system are operatively connected to the stator and the rotor. The first electronic sub-system is arranged at least on a first circuit carrier plane and a second circuit carrier plane and the second electronic sub-system is arranged at least on the first circuit carrier plane and a third circuit carrier plane. In addition, the first, second and third circuit carrier planes are arranged perpendicular to an axis of rotation of the rotor and spaced apart from each other along the axis of rotation.

U.S. Pat. No. 9,878,741 (B2) relates to a sensor arrangement on a steering column of a motor vehicle and consists of at least two sensors for redundant capture of the torque applied to the steering column and/or for capture of the rotation angle of the steering column. The sensors of the sensor arrangement are connected to a power supply via electrical lines, each of the sensors transmitting data to a controller via a signal line. In order to reduce the number of connecting cables to the controller, provision is made for the signal lines from two sensors to be connected to the controller via a common data line. Each sensor can be individually actuated by the controller via the data line and the signal line such that a signal from the controller prompts the addressed sensor to output its data to the controller via the signal line and the data line.

JP2015063270 (A) describes that first sensors are provided which are two-system output sensors to detect a rotation angle of a steering shaft of a steering wheel or a steering shaft interlocking body, containing output parts of two systems capable of detecting an absolute position. Output values of the two systems of the first sensors linearly change at the same increase rate each other in a rotation region of the steering shaft or the steering shaft interlocking body, with increase/decrease direction thereof totally opposite from a start point being a reference position of the rotation region. An abnormality diagnosis section is provided which diagnoses signal abnormality of the two-system output sensors by performing comparison-calculation of the output values of the two systems of the sensor signal of the first sensors.

However, there is a need to provide an improved redundancy means for a vehicle steering system.

Therefore, it would be advantageous to have an improved technology to provide redundancy means for a vehicle steering system.

SUMMARY OF THE INVENTION

This need is met with the subject matter of the independent claim, wherein further embodiments are incorporated in the dependent claims.

In an aspect, there is provided a steering system for a vehicle, the steering system comprising:
 a steering gear;
 two knuckles of two steerable wheels;
 a steering actuator;
 a plurality of sensors; and
 a processing unit.

The steering gear is connected to a first knuckle of the two knuckles and the steering gear is connected to a second knuckle of the two knuckles. The steering gear is connected to the steering actuator. The plurality of sensors are mounted at locations associated with the steering gear. Each of the plurality of sensors is configured to acquire steering system position information. Each of the plurality of sensors are configured to provide acquired steering system information to the processing unit.

In this way, because steering system position information is being acquired by more than one sensor associated with the steering gear, a safe steering function can be provided even in the case of a failure in position sensing from one sensor.

The sensors can acquire steering system position information associated with different aspects of the steering gear, taking different measurements to determine steering position information that can involve both linear and angular measurements. Therefore in addition to providing for redundancy if failure occurs, the processing unit can determine a reliability of steering position as this can be determined from a number of independent sources, thereby improving accuracy and reliability.

In an example, at least one of the plurality of sensors is configured to measure a steering position on at least one of the two knuckles and/or associated connection rod.

In an example, at least one first sensor of the plurality of sensors is configured to measure a steering position on the first knuckle and/or associated connection rod and at least one second sensor of the plurality of sensors is configured to measure a steering position on the second knuckle and/or associated connection rod.

In an example, the connection between the steering gear and two knuckles comprises an output shaft of the steering gear, and wherein at least one of the plurality of sensors is configured to measure a steering position on the output shaft.

In an example, the connection between the steering gear and steering actuator comprises a torque transmitting unit or input shaft. At least one of the plurality of sensors is configured to measure a steering position on the torque transmitting unit or input shaft.

In an example, at least two of the plurality of sensors are configured to measure a steering position on the torque transmitting unit or input shaft.

In an example, at least one sensor is mounted on a steering column.

In an example, at least one of the plurality of sensors is configured to determine a steering position on the basis of an internal measurement of the steering gear.

In an example, at least two of the plurality of sensors are configured to determine a steering position on the basis of an internal measurement of the steering gear.

In an example, at least one of the plurality of sensors is configured to acquire linear position information and/or at least one of the plurality of sensors is configured to acquire angular position information.

The above aspect and examples will become apparent from and be elucidated with reference to the embodiments described hereinafter.

Exemplary embodiments will be described in the following with reference to the following drawings.

DETAILED DESCRIPTION OF EMBODIMENTS

Figure 1:
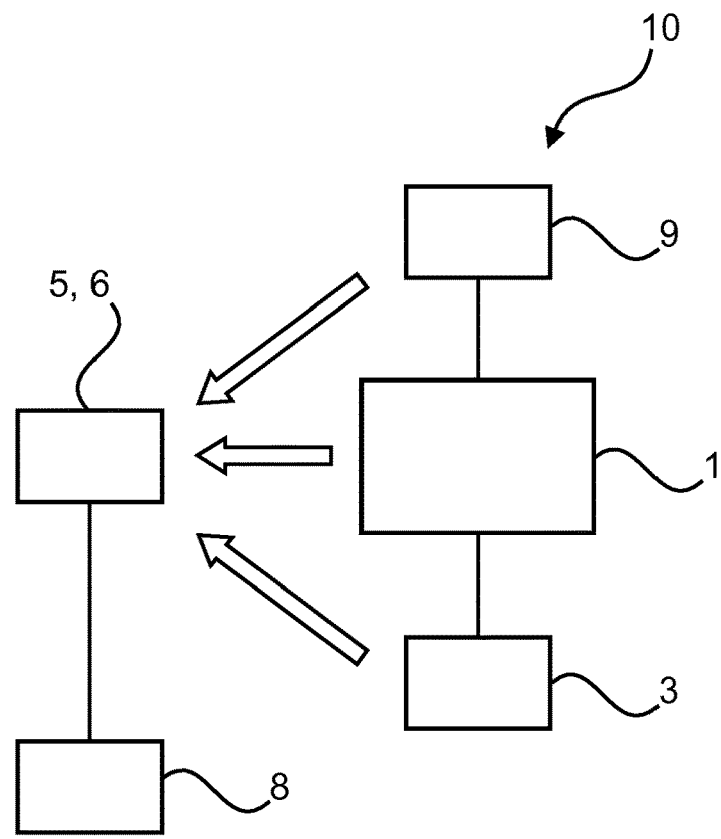
FIG. 1 is a schematic representation of an example of a steering system for a vehicle.

FIG. 1 shows an example of a steering system 10 for a vehicle. The steering system comprises a steering gear 1, two knuckles 9 of two steerable wheels, a steering actuator 3, a plurality of sensors 5, 6, and a processing unit 8. The steering gear is connected to a first knuckle of the two knuckles and the steering gear is connected to a second knuckle of the two knuckles. The steering gear is connected to the steering actuator. The plurality of sensors are mounted at locations associated with the steering gear. Each of the plurality of sensors is configured to acquire steering system position information. Each of the plurality of sensors are configured to provide the acquired steering system information to the processing unit.

In an example, the processing unit is a vehicle dynamics control ECU.

In an example, the steering gear is connected to each knuckle via an associated connection rod.

According to an example, at least one of the plurality of sensors is configured to measure a steering position on at least one of the two knuckles and/or associated connection rod.

According to an example, at least one first sensor of the plurality of sensors is configured to measure a steering position on the first knuckle and/or associated connection rod and at least one second sensor of the plurality of sensors is configured to measure a steering position on the second knuckle and/or associated connection rod.

According to an example, the connection between the steering gear and two knuckles comprises an output shaft of the steering gear. At least one of the plurality of sensors is configured to measure a steering position on the output shaft.

According to an example, the connection between the steering gear and steering actuator comprises a torque transmitting unit or input shaft 2. At least one of the plurality of sensors is configured to measure a steering position on the torque transmitting unit or input shaft.

According to an example, at least two of the plurality of sensors are configured to measure a steering position on the torque transmitting unit or input shaft.

According to an example, at least one sensor is mounted on a steering column.

According to an example, at least one of the plurality of sensors is configured to determine or measure a steering position on the basis of an internal measurement of the steering gear.

According to an example, at least two of the plurality of sensors are configured to determine or measure a steering position on the basis of an internal measurement of the steering gear.

In an example, at least one sensor is located internal to the steering gear.

According to an example, at least one of the plurality of sensors is configured to acquire linear position information and/or at least one of the plurality of sensors is configured to acquire angular position information.

In an example, at least one of the plurality of sensors is configured to measure torque on any of the steering gear internal parts.

Figure 2:
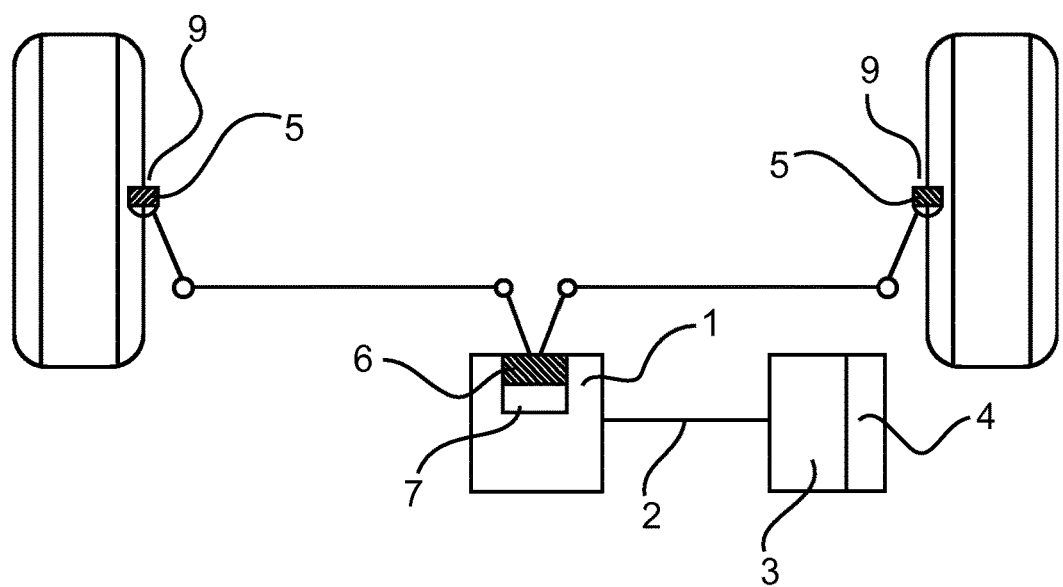
FIG. 2 is a schematic representation of an example of a redundant sensor layout for a steering system.
Figure 3:
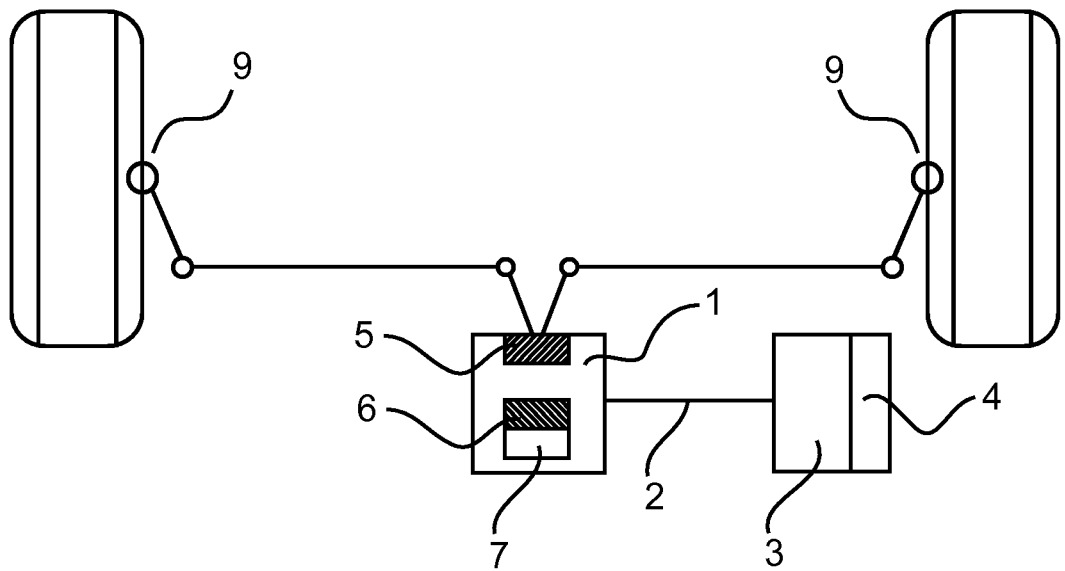
FIG. 3 is a schematic representation of an example of a redundant sensor layout for a steering system.
Figure 4:
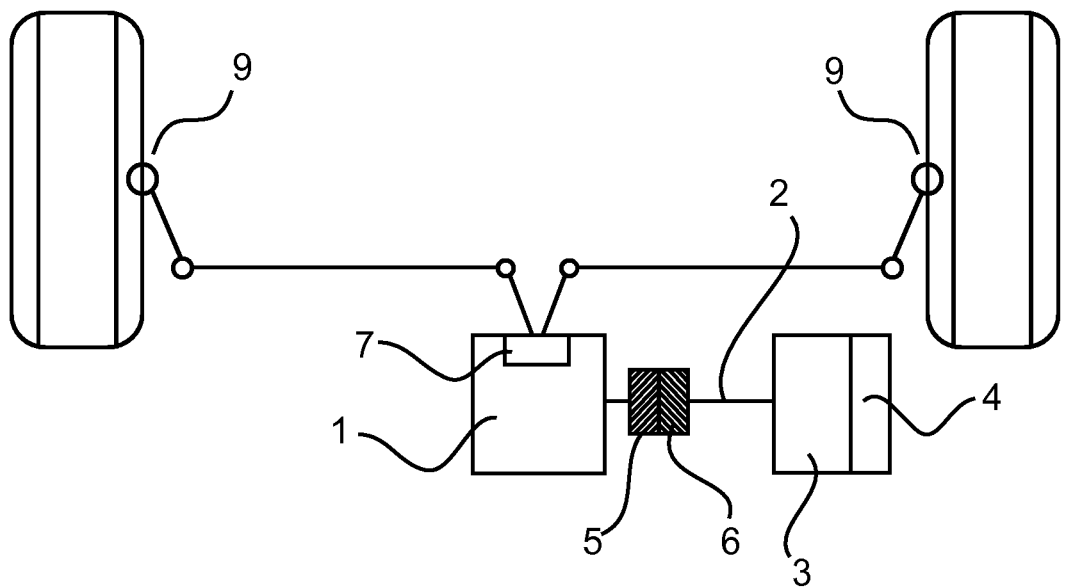
FIG. 4 is a schematic representation of an example of a redundant sensor layout for a steering system.

FIGS. 2-4 show further details of a redundant sensor layout for a steering system. The sensor layout is provided for redundant steering control architecture. The steering systems contains a steering gear 1, a steering actuator 3 which can provide a servo support to a manual operation or a torque overlay for a driverless operation, a torque transmitting unit 2, the steering gear and actuator and steering control electronics 4. Redundant steering position sensors 5, 6 provide information to the vehicle dynamics control ECUs (processing unit), which can be at the same time. The sensors are designed so that the control system can determine the reliability of the measurement. When one of the sensors 5 has an error the other one 6 can still provide steering system position information to the control electronics.

FIG. 2 shows one example of the redundant sensor layout. Steering position is to be measured using at least two sensors on the knuckles of the steered wheels 5 and on the input shaft (or torque transmitting unit) 2 or output shaft 6 of the steering gear 1. Torque measurement 7 on any of the steering gear internal parts can be also provided for control.

FIG. 3 shows another example of the redundant sensor layout. The redundant steering angle measurement is provided via an integrated steering gear 1. The steering gear includes at least two steering position sensors internally 5, 6 dedicated to determine steering system position. Torque measurement 7 on any of the steering gear internal parts can be also provided for control.

FIG. 4 shows another example of the redundant sensor layout. Steering position measurement with sensors 5, 6 is realized on the torque transmitting unit 2 between the steering gear 1 and the steering actuator unit 3, e.g. this sensor placement can be realized in the steering column.

Torque measurement 7 on any of the steering gear internal parts can be also provided for control.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

LIST OF REFERENCE NUMBERS

1—steering gear
2—torque transmitting unit or input shaft to steering gear
3—steering actuator
4—steering control electronics
5—position measurement sensor
6—position measurement sensor
7—torque measurement sensor
8—processing unit or ECU
9—knuckles of steerable wheels
10—steering system

The invention claimed is:

1. A steering system for a vehicle, the steering system comprising:
a steering gear;
two knuckles of two steerable wheels;
a steering actuator;
a plurality of sensors; and
a processing unit;
wherein, the steering gear is connected to a first knuckle of the two knuckles and the steering gear is connected to a second knuckle of the two knuckles, and wherein the connection between the steering gear and two knuckles comprises an output shaft of the steering gear;
wherein, the steering gear is connected to the steering actuator, and wherein the connection between the steering gear and steering actuator comprises a torque transmitting unit or input shaft;
wherein, the plurality of sensors are mounted at locations associated with the steering gear;
wherein, each of the plurality of sensors is configured to acquire steering system position information;
wherein, each of the plurality of sensors are configured to provide the acquired steering system information to the processing unit;
wherein at least one of the plurality of sensors is configured to measure a steering position on at least one of the two knuckles and/or associated connection rod;
wherein at least one of the plurality of sensors is configured to measure a steering position on the output shaft; and
wherein at least one of the plurality of sensors is configured to measure a steering position on the torque transmitting unit or input shaft.

2. The steering system according to claim 1, wherein
at least one first sensor of the plurality of sensors is configured to measure a steering position on the first knuckle and/or associated connection rod, and
at least one second sensor of the plurality of sensors is configured to measure a steering position on the second knuckle and/or associated connection rod.

3. The steering system according to claim 1, wherein
at least two of the plurality of sensors are configured to measure a steering position on the torque transmitting unit or input shaft.

4. The steering system according to claim 1, wherein
at least one sensor is mounted on a steering column.

5. The steering system according to claim 1, wherein
at least one of the plurality of sensors is configured to determine a steering position on the basis of an internal measurement of the steering gear.

6. The steering system according to claim 5, wherein
at least two of the plurality of sensors are configured to determine a steering position on the basis of an internal measurement of the steering gear.

7. The steering system according to claim 1, wherein
at least one of the plurality of sensors is configured to acquire linear position information and/or at least one of the plurality of sensors is configured to acquire angular position information.

* * * * *